May 11, 1948.  K. C. COOPER  2,441,186
ACCUMULATOR STARTING VALVE
Filed July 23, 1943  2 Sheets-Sheet 1

INVENTOR
Kenneth C. Cooper

Charles A Warren
ATTORNEY

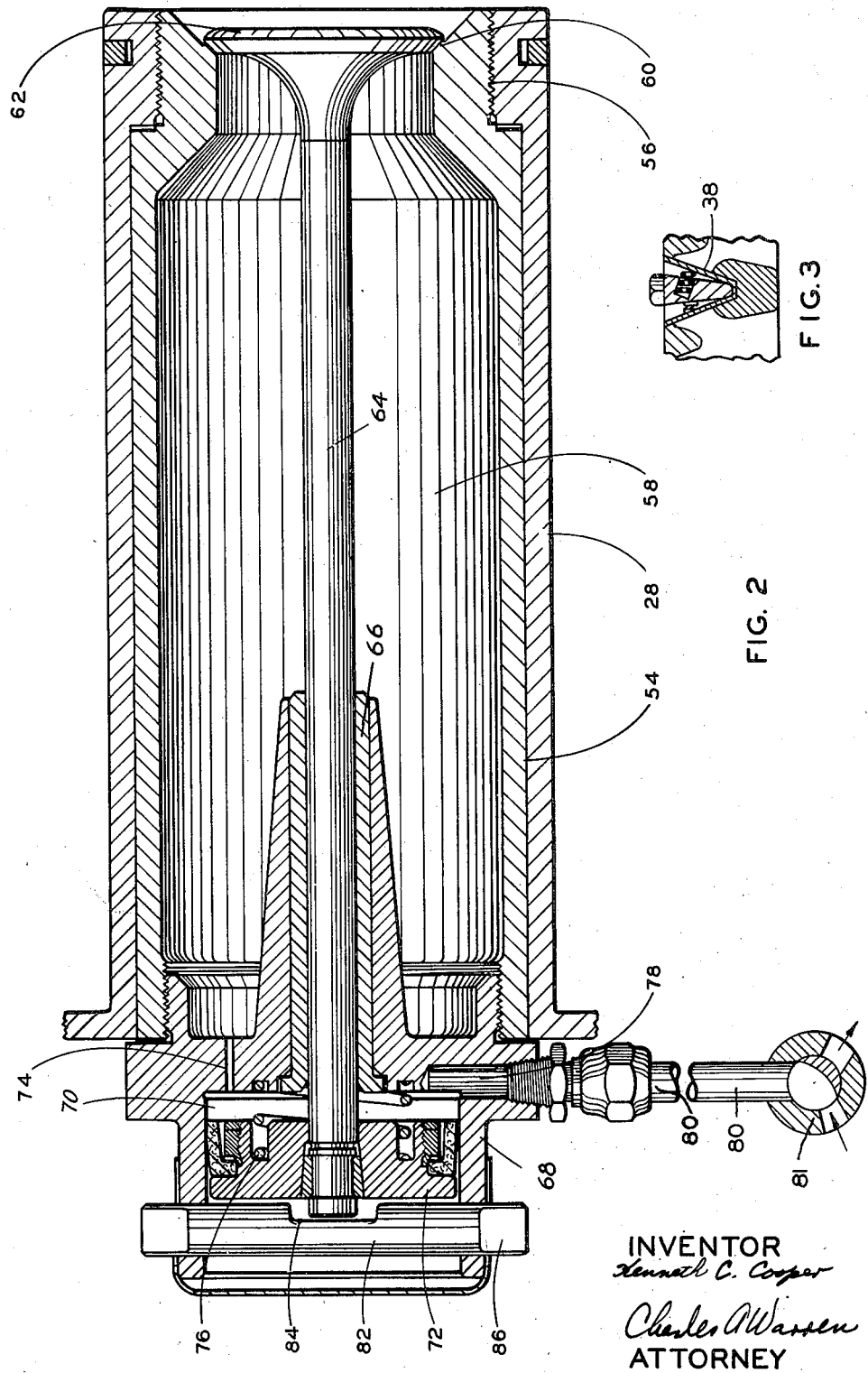

Patented May 11, 1948

2,441,186

UNITED STATES PATENT OFFICE 2,441,186

ACCUMULATOR STARTING VALVE

Kenneth C. Cooper, Portland, Conn., assignor to United Aircraft Corporation, East Hartford, Conn., a corporation of Delaware Application July 23, 1943, Serial No. 495,926

7 Claims. (Cl. 222—3)

This invention relates to an accumulator valve device particularly adapted for controlling the admission of gas to a free-piston engine-and-compressor unit for starting.

In prior devices of this character, the outlet for the accumulator chamber, through which gas under pressure is released, has been closed by a poppet valve held seated by pressure within the storage chamber. Rapid opening of the valve for releasing the gas has, therefore, been resisted by the pressure within the storage chamber. An object of this invention is to overcome this objection by having a valve which is opened by the pressure within the chamber.

The valves of earlier devices have been held closed by fluid pressure on a piston connected to stem of the valve. A feature of this invention is an arrangement of the valve and piston such that, during the accumulation of gas under pressure in the chamber, the pressure acting on the piston to hold the valve closed is at least as great as the pressure acting on the valve to open it.

Another feature of this invention is an accumulator valve device so arranged that release of pressure on the inlet conduit will cause rapid opening of the valve.

Another feature of this invention is the arrangement of a starting mechanism for a free-piston engine-and-compressor unit which provides for admission of compressed gases to the air spring of the unit for starting and which will prevent escape of gases from the air spring after starting.

Other objects and advantages will be apparent from the specification and claims, and from the accompanying drawing which illustrates what is now considered to be a preferred embodiment of the invention.

Fig. 2 is a sectional view on a larger scale through the accumulator valve device.

Fig. 3 is a sectional view through one of the intake valves.

Figure 1:
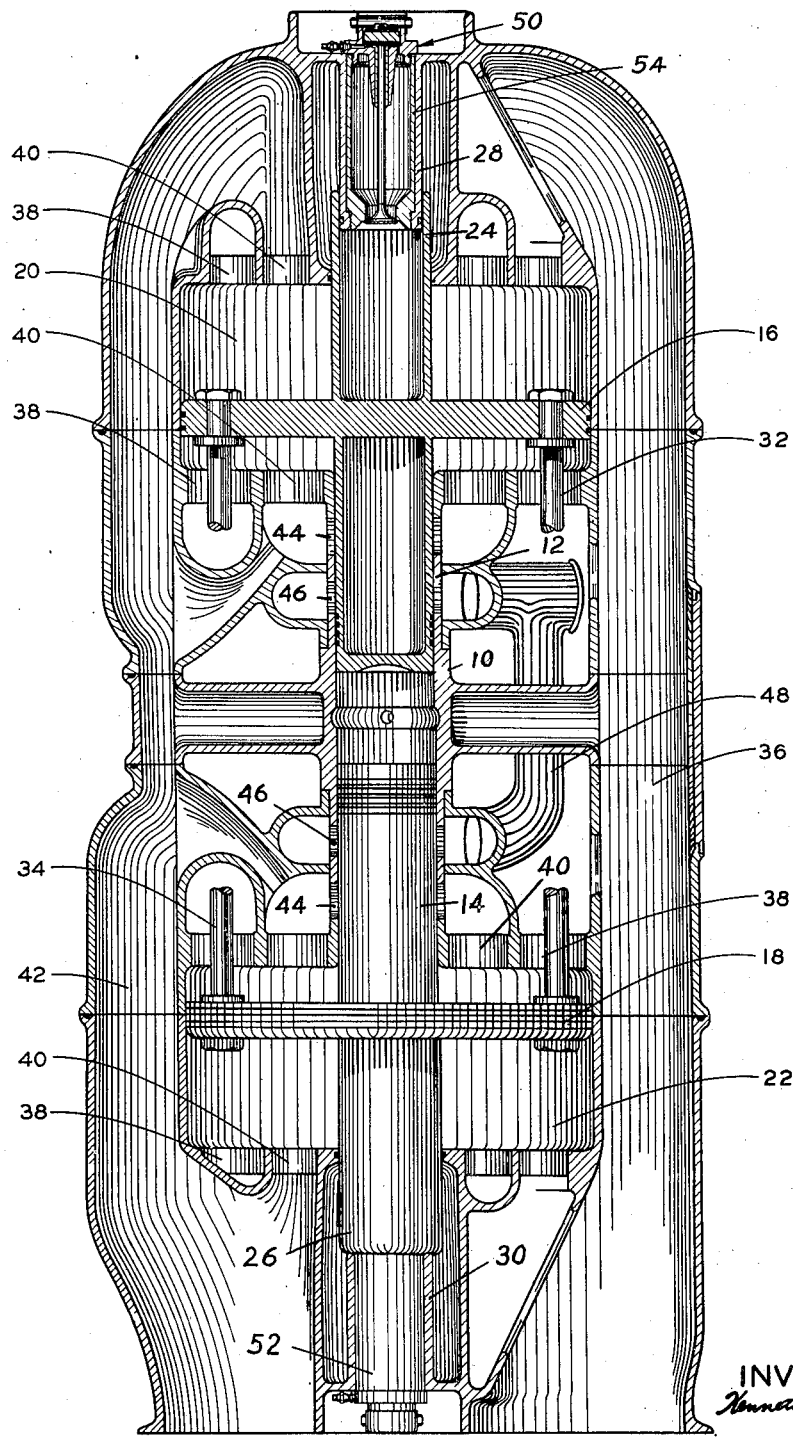
Fig. 1 is a side elevation of a free-piston engine with these devices thereon.

The unit shown includes an engine cylinder 10 having reciprocating pistons 12 and 14 to which compressor pistons 16 and 18 in cylinders 20 and 22 are integrally connected. Sleeves 24 and 26 attached to the compressor pistons complete the reciprocating piston assemblies. The sleeves in combination with stationary pistons 28 and 30 form air spring cylinders.

The piston assemblies are moved apart by the burning of fuel injected into engine cylinder 10. Air compressed in the air spring cylinders on the power stroke returns the piston assemblies. These assemblies are maintained at equal distances from the center of the engine cylinder by a linkage of which rods 32 and 34, extending from the compressor pistons, may form a part.

Intake manifold 36 conducts air to intake valves 38, Fig. 3, through which air alternately enters opposite ends of the compressor cylinders. The compressed air leaves the cylinders through discharge valves 40, similar to valves 38 and also at opposite ends of the compressor cylinders, and passes through scavenge manifold 42 and through ports 44 which are uncovered by pistons 12 and 14 at the end of the power stroke, thereby permitting air to be blown through the engine cylinder and exhaust ports 46 into exhaust manifold 48. Valves 38 and 40 may be the type shown in Huff Patent No. 1,599,414, dated September 14, 1926.

Starting devices 50 and 52 for the unit are mounted in air spring pistons 28 and 30. The devices are similar and only device 50 in piston 28 will be described in detail. This device includes a housing 54, Fig. 2, held within piston 28 by interengaging threads 56 and having accumulator or storage chamber 58. This chamber has a port 60 communicating with the air spring cylinder and closed by a poppet valve 62. The stem 64 of this valve is slideable in a guide 66 in a cap 68 forming a part of housing 54. Valve 62 closes port 60 by movement toward the storage chamber and is opened by movement away from the storage chamber, so that the pressure of the gas within the storage chamber assists in opening of the valve, and pressure of gas in the air spring holds the valve closed during operation of the unit.

Cap 68, which closes the end of chamber 58, has a bore forming a cylinder 70 which receives a piston 72 on the end of valve stem 64. The inner end of cylinder 70 is connected with the storage chamber by a restricted channel 74. A coil spring 76 in the cylinder moves the piston toward valve closing position. Cap 68 has an inlet channel 78 intersecting the inner end of cylinder 70 and a conduit 80 is connected to this channel.

When gas under pressure is introduced to the device through conduit 80, pressure beneath piston 72 assists spring 76 in keeping valve 62 closed. Gas under pressure enters storage chamber 58 through restricted channel 74 and accumulates in the chamber. The pressure of the gas acting on the piston (which is at least as large as valve 62) and the pressure of spring 76 will keep the valve closed, since pressure in the storage chamber cannot exceed the pressure on the piston until cylinder 70 is vented.

After a sufficient pressure has been built up in the storage chamber, conduit 80 is opened to the atmosphere as by a two-way cock 81, Fig. 2, of conventional construction. This results in a sudden drop in pressure on the piston holding the valve closed. The pressure in storage chamber 58 acting on valve 62 opens the valve and the gas stored in the chamber is discharged quickly through the valve port into the air spring.

Throttling channel 74 is so proportioned that a negligible volume of gas escapes from the storage chamber into cylinder 70, while valve 62 is open. As soon as the gas discharges from chamber 58, valve 62 is closed by spring 76. The time that valve 62 is open for engine starting is much shorter than the time for filling chamber 58.

In starting the free-piston unit, the engine pistons are first moved to the outer ends of their strokes. Gas is conducted from a source through conduits 80 to the starting devices. Release of pressure in conduits 80 causes a sudden inrush of compressed air from the starting devices into the air springs which moves the engine pistons toward each other to the inner ends of their strokes.

The same action occurs in both air springs and the opposed pistons are simultaneously moved toward each other. The storage chambers in the starting devices accommodate the required amount of gas for engine starting without causing an excessive piston stroke. The valves are closed after the discharge of gas into the air springs and discharge of gas from the air springs into the accumulator chambers is prevented during operation of the engine.

Cap 68 has a transversely extending pin 82 which is notched at 84 in line with valve stem 64. The outer ends of pin 82 are flattened as shown at 86 to receive a wrench for turning the pin. When pin 82 is turned, it will engage the end of valve stem 64 and open the valve for relieving pressure in the air spring so that the piston assemblies may be moved to starting position.

It is to be understood that the invention is not limited to the specific embodiment herein illustrated and described, but may be used in other ways without departure from its spirit as defined by the following claims.

I claim:

1. An accumulator device comprising a housing, having a storage chamber therein, and a port for said chamber, a valve movable in said housing and closing said port, said valve having a stem, a spring normally closing said valve, the latter, in opening the port, being movable away from the chamber under the pressure of fluid within the storage chamber acting directly on the valve, a cylinder separate from the storage chamber and a piston in said cylinder connected to said valve stem, means for introducing fluid under pressure from a source outside said chamber to said cylinder for holding the valve closed against the action of the pressure within the storage chamber, and a restricted passage, smaller than the inlet means to the cylinder, for admitting fluid from said cylinder to said chamber for filling said chamber.

2. A valve device for the admission of fluid under pressure to a chamber, comprising a housing, having a storage chamber therein, and a port providing a communication between said chambers, a valve movable in said housing and closing said port, said valve having a stem, a spring normally closing said valve, the latter, in opening the port, being movable away from the storage chamber under the pressure of fluid within the storage chamber acting directly on the valve, a piston positioned in a bore provided by the housing and connected to the valve, said bore being separate from the storage chamber, means for introducing fluid under pressure from a source outside said chambers to said bore for urging the valve into port closing position against the action of the pressure within the storage chamber, and a restricted passage having a smaller flow area than the fluid inlet means for admitting fluid from said bore to said chamber for filling said chamber.

3. A valve device for the admission of fluid under pressure to a chamber, comprising a housing, having a storage chamber therein, and a port providing a communication between said chambers, a valve movable in said housing and closing said port, said valve having a stem, a spring normally closing said valve, the latter in opening the port, being movable away from the storage chamber under the pressure of fluid within the storage chamber acting directly on the valve, a piston positioned in a bore provided by the housing and connected to the valve, said bore being separate from said storage chamber, a passage in said housing for the introduction of fluid under pressure to said bore, and a restricted passage between said bore and the storage chamber through which fluid is admitted to the chamber, said restricted passage having a smaller flow area than said first passage.

4. In an accumulator structure, a housing having a storage chamber therein, and a port for said chamber, a valve movable in said housing for closing said port, said valve being movable, by pressure within the storage chamber acting directly on the valve, in a direction away from the chamber for opening said port, a spring for normally holding the valve in port closing position, a piston connected to said valve, a cylinder separate from the chamber provided by said housing in which the piston is slideable, said housing having a passage for directing fluid under pressure to said cylinder for holding the valve in port closing position independently of pressure in said storage chamber, a restricted passage between said cylinder and said storage chamber through which fluid under pressure is delivered to the storage chamber, and means for venting said cylinder at a rate substantially greater than the flow rate for the restricted passage.

5. In a valve structure for the rapid delivery of compressed fluid to a chamber, a member having a storage chamber therein, said member being mounted adjacent to said first chamber and also having a port providing communication between said chambers, a valve closing said port and movable by pressure in said storage chamber acting directly on the valve in a direction away from the storage chamber for opening the port, a valve stem for the valve, a piston on said valve stem, said member having a bore in which said piston is slideable, means for admitting fluid under pressure to said bore for holding the valve closed, a restricted passage between the bore and the storage chamber for admission of fluid from said bore to the storage chamber, and means for rapidly venting the bore at a rate greater than the flow rate for the restricted passage to cause said valve to open.

6. In a valve structure for the rapid delivery of compressed fluid to a chamber, a member having a storage chamber therein, said member being mounted adjacent to said first chamber and also having a port providing communication between said chambers, a valve closing said port and movable by pressure in said chamber in a direction away from the storage chamber for opening the port, a valve stem for the valve, a spring for normally holding said valve in closed position, a piston on said valve stem, said member having a bore separate from said storage chamber and in which said piston is slideable, means for admitting fluid under pressure to said bore for holding the valve closed, a restricted passage between the bore and the storage chamber for admission of fluid from said bore to the storage chamber, and means for rapidly venting the bore at a rate greater than the flow rate for the restricted passage to cause said valve to open.

7. In a valve structure for the rapid delivery of compressed fluid to a chamber, a member having a storage chamber therein, said member being mounted adjacent to said first chamber and also having a port providing communication between said chambers, a valve closing said port and movable by pressure in said storage chamber acting directly on said valve in a direction away from the storage chamber for opening the port, a valve stem for the valve, a piston on said valve stem, said member having a bore separate from said storage chamber and in which said piston is slideable, a spring positioned in said bore and engaging said piston for holding the valve closed, means for admitting fluid under pressure to said bore for holding the valve closed, a restricted passage between the bore and the storage chamber for admitting fluid from the bore to the storage chamber, and means for rapidly venting the bore at a rate greater than the flow rate for the restricted passage to cause said valve to open.

KENNETH C. COOPER.

REFERENCES CITED

The following references are of record in the file of this patent:

UNITED STATES PATENTS

| Number | Name | Date |
|---|---|---|
| 387,256 | Pratt | Aug. 7, 1888 |
| 1,646,640 | Daniel | Oct. 25, 1927 |
| 1,799,914 | Lemoine | Apr. 7, 1931 |
| 2,168,828 | Pescara | Aug. 8, 1939 |
| 2,189,497 | Pescara | Feb. 6, 1940 |
| 2,215,326 | Janicke | Sept. 17, 1940 |
| 2,306,978 | Pescara | Dec. 29, 1942 |

FOREIGN PATENTS

| Number | Country | Date |
|---|---|---|
| 11,138 | Great Britain | Aug. 11, 1884 |
| 14,413 | Great Britain | June 23, 1906 |